US012080072B2

(12) United States Patent
Imran et al.

(10) Patent No.: US 12,080,072 B2
(45) Date of Patent: Sep. 3, 2024

(54) HISTORY-BASED IDENTIFICATION OF INCOMPATIBLE TRACKS

(71) Applicant: Aptiv Technologies AG, Schaffhausen (CH)

(72) Inventors: Syed Asif Imran, Moorpark, CA (US); Jan K. Schiffmann, Newbury Park, CA (US); Nianxia Cao, Oak Park, CA (US)

(73) Assignee: Aptiv Technologies AG, Schaffhausen (CH)

( * ) Notice: Subject to any disclaimer, the term of this patent is extended or adjusted under 35 U.S.C. 154(b) by 580 days.

(21) Appl. No.: 17/308,908

(22) Filed: May 5, 2021

(65) Prior Publication Data
US 2022/0300743 A1 Sep. 22, 2022

Related U.S. Application Data (60) Provisional application No. 63/162,851, filed on Mar. 18, 2021.

(51) Int. Cl.
*G06V 20/56* (2022.01)
*G01C 21/20* (2006.01)
(Continued)

(52) U.S. Cl.
CPC ............ *G06V 20/56* (2022.01); *G06F 18/251* (2023.01); *G08G 1/166* (2013.01)

(58) Field of Classification Search
None
See application file for complete search history.

(56) References Cited

U.S. PATENT DOCUMENTS 8,705,797 B2 * 4/2014 Zeng ..................... G01S 13/931
348/169
10,565,468 B2 2/2020 Schiffmann
(Continued)

FOREIGN PATENT DOCUMENTS

CN 207396739 U * 5/2018
CN 208915155 U * 5/2019 ............. B60K 28/14
(Continued)

OTHER PUBLICATIONS

"Extended European Search Report", EP Application No. 22160900. 1, Aug. 2, 2022, 11 pages.
(Continued)

*Primary Examiner* — Mohammed Rachedine
(74) *Attorney, Agent, or Firm* — Harness, Dickey & Pierce, P.L.C.

(57) ABSTRACT

This document describes methods and systems directed at history-based identification of incompatible tracks. The historical trajectory of tracks can be advantageous to accurately determine whether tracks originating from different sensors identify the same object or different objects. However, recording historical data of several tracks may consume vast amounts of memory or computing resources, and related computations may become complex. The methods and systems described herein enable a sensor fusion system of an automobile or other vehicle to consider historical data when associating and pairing tracks, without requiring large amounts of memory and without tying up other computing resources.

16 Claims, 7 Drawing Sheets

(51) Int. Cl.
*G01S 13/72* (2006.01)
*G01S 13/86* (2006.01)
*G01S 13/931* (2020.01)
*G01S 17/86* (2020.01)
*G01S 17/931* (2020.01)
*G06F 18/25* (2023.01)
*G08G 1/16* (2006.01)

(56) References Cited

U.S. PATENT DOCUMENTS

| | | | |
|---|---|---|---|
| 2013/0236047 A1* | 9/2013 | Zeng | G01S 13/726 |
| | | | 382/103 |
| 2015/0324652 A1 | 11/2015 | Mizutani | |
| 2017/0206436 A1 | 7/2017 | Schiffmann | |
| 2018/0267544 A1* | 9/2018 | Lee | G01S 13/931 |
| 2019/0147372 A1 | 5/2019 | Luo et al. | |
| 2021/0231794 A1 | 7/2021 | Song et al. | |
| 2021/0256328 A1* | 8/2021 | Muto | G01S 13/931 |

FOREIGN PATENT DOCUMENTS

| | | | | |
|---|---|---|---|---|
| CN | 109987025 A | * | 7/2019 | |
| CN | 112166304 A | * | 1/2021 | ........... G01S 13/865 |

OTHER PUBLICATIONS

"Kurtosis", Retrieved from https://en.wikipedia.org/w/index.php?title=Kurtosis&oldid=930917675 on Dec. 18, 2020, 12 pages.

"Kurtosis (K)", Retrieved from https://www.vosesoftware.com/riskwiki/Kurtosis(K).php on Dec. 18, 2020, 2017, 7 pages.

"Extended European Search Report", EP Application No. 21153654.5, Jun. 17, 2021, 12 pages.

Bhuvana, et al., "Integrated Camera and Radar Tracking using Multi-Model Cubature Kalman Filter", Nov. 11, 2019, 5 pages.

Sengupta, et al., "A DNN-LSTM based Target Tracking Approach using mmWave Radar and Camera Sensor Fusion", Jul. 15, 2019, 6 pages.

* cited by examiner

Array = [0, 1, 1, 1, 1, 1, 0, 1, 1, 0, 1, 1, 1, 1, 1, 0]
= 0x7DBE

HISTORY-BASED IDENTIFICATION OF INCOMPATIBLE TRACKS

CROSS-REFERENCE TO RELATED APPLICATION

This application claims the benefit under 35 U.S.C. 119(e) of U.S. Provisional Application No. 63/162,851, filed Mar. 18, 2021, the disclosure of which is hereby incorporated by reference in its entirety herein.

BACKGROUND

Automotive vehicles are becoming more sophisticated with the addition of sensors used to track objects near the vehicle. These objects may include other vehicles, pedestrians, animals, and inanimate objects, such as trees and street signs. The sensors (e.g., optical cameras, radar, Light Detection and Ranging (LiDAR)) collect low-level data-that are processed by sensor trackers to generate low-level tracks. There may be many tracks from all the sensors, especially in a cluttered environment. As the tracks are generated, steps may be taken to pair and associate the tracks originating from the different sensors to a common object. With many different possible associations or pairings of tracks, correctly matching the different tracks to a common object can be a difficult task. Improving the accuracy and speed of track association and pairing may increase safety and reliability of an automobile, in particular, for autonomous or semi-autonomous control.

SUMMARY

This document describes methods and systems pertaining to history-based identification of incompatible tracks. The historical trajectory of tracks can be advantageous to accurately determine whether tracks originating from different sensors identify the same object or different objects. However, keeping a record of historical data pertaining to several tracks may consume vast amounts of memory or other computing resources, and related computations may become complex. The methods and systems described herein provide a solution for considering historical data for correlating tracks from different sensors, in a way that seeks to minimize memory consumption and reduce computational complexity.

In one example, a method includes determining, by an object fusion system of a vehicle and according to first sensor data obtained by a first sensor, a first track of a first object in proximity to the vehicle. The method further includes determining, by the object fusion system and according to second sensor data obtained by a second sensor, a second track of a second object in proximity to the vehicle. The method further includes maintaining, by the object fusion system, a feasibility matrix indicative of a probability that the first object and the second object are a same object at a given time index and an incompatibility matrix indicative of whether the first track and the second track are historically associated with a same object. The method further includes determining whether the incompatibility matrix indicates that the first track and the second track are associated with different objects. The method further includes, responsive to determining that the incompatibility matrix indicates that the first track and the second track are associated with different objects, determining that the first track and the second track comprise a history of being related to different objects. The method further includes, responsive to determining that the first track and the second track comprise the history of being related to different objects, adjusting the feasibility matrix by decreasing the probability that the first object and the second object are the same object. The method further includes responsive to adjusting the feasibility matrix by decreasing the probability that the first object and the second object are the same object, outputting, to an automotive system of the vehicle, information identifying the first object separate from the second object to avoid a collision between the vehicle and either the first object or the second object.

In one example, a system includes a processor configured to perform this and other methods. In another example, a system is described including means for performing this and other methods. This document also describes a computer-readable storage medium comprising instructions that, when executed, configure a processor to perform the above-summarized method and other methods set forth herein, in addition to describing systems configured to perform the above-summarized method and the other methods set forth herein.

This summary introduces simplified concepts of history-based identification of incompatible tracks. This summary is not intended to identify essential features of the claimed subject matter, nor is it intended for use in determining the scope of the claimed subject matter. That is, one problem solved by the described techniques is a problem of historical data being too costly in terms of memory consumption and computational complexity to be used as an effective tool when associating tracks originating from different sensors. Therefore, although primarily described in the context of improving object-fusion functionality of an automotive vehicle, lowering the memory and computational costs of historical data can be applied to other applications where accurate object fusion is desired. In addition, these concepts may be accomplished in an inverse form; that is, the techniques described herein may apply to history-based identification of compatible tracks.

BRIEF DESCRIPTION OF THE DRAWINGS

The details of one or more aspects of history-based identification of incompatible tracks are described in this document with reference to the following figures. The same numbers are often used throughout the drawings to reference like features and components:

FIG. 5-1 illustrates an example implementation of history-based identification of incompatible tracks in accordance with techniques of this disclosure;

FIG. 5-2 illustrates another example implementation of history-based identification of incompatible tracks in accordance with techniques of this disclosure.

DETAILED DESCRIPTION

Overview

Automotive technology is successfully increasing autonomy and safety. One way to achieve this, includes equipping vehicles with many different types of sensors, including optical cameras, radar systems, and LiDAR systems. The sensors collect low-level data that are processed by sensor trackers to generate low-level tracks, representing different aspects of the environment surrounding the vehicle. Much of the raw data collected, which is relevant to autonomy and safety, represents different objects in the environment. These objects may be dynamic or stationary and may include pedestrians, animals, other vehicles, vegetation, buildings, street signs, and many other elements that may exist in the environment. Often, the environment is cluttered with several objects of all different types. One example of a cluttered environment may be a busy downtown street in a large metropolis. This environment might include many pedestrians, vehicles, and other objects.

A major challenge for automotive systems with different sensors is to associate or disassociate the tracks collected from different sensor modalities. For example, the automotive system attempts to determine whether a track originating from a camera matches a track originating from a radar system.

Currently, the available processes of track association are mostly focused on the states and attributes of the tracks to make the association decision. The historical trajectory of the tracks is not generally taken into consideration. Storing and processing historical information may be costly in terms of memory and computational complexity. However, the historical information may be helpful, especially in a cluttered environment, when an accurate association decision is to be determined between two tracks from a quantity of different tracks originating from one or more different sensors.

As an example, there may be a radar track and a vision track close to each other that may seem like a good match at a particular point in time. However, if the historical trajectories of the two different tracks are analyzed, they may suggest that the two different tracks came from different locations and, therefore, refer to different objects rather than a common object. In this case, matching the two different tracks may not be a good decision.

This document describes methods and systems directed at history-based identification of incompatible tracks. The historical trajectory of tracks can be advantageous to accurately determine whether tracks originating from different sensors identify the same object or different objects. However, recording historical data of several tracks may consume vast amounts of memory or computing resources, and related computations may become complex. The methods and systems described herein enable a sensor fusion system of an automobile or other vehicle to consider historical data when associating and pairing tracks, without requiring large amounts of memory and without tying up other computing resources.

Example Environment

Figure 1:
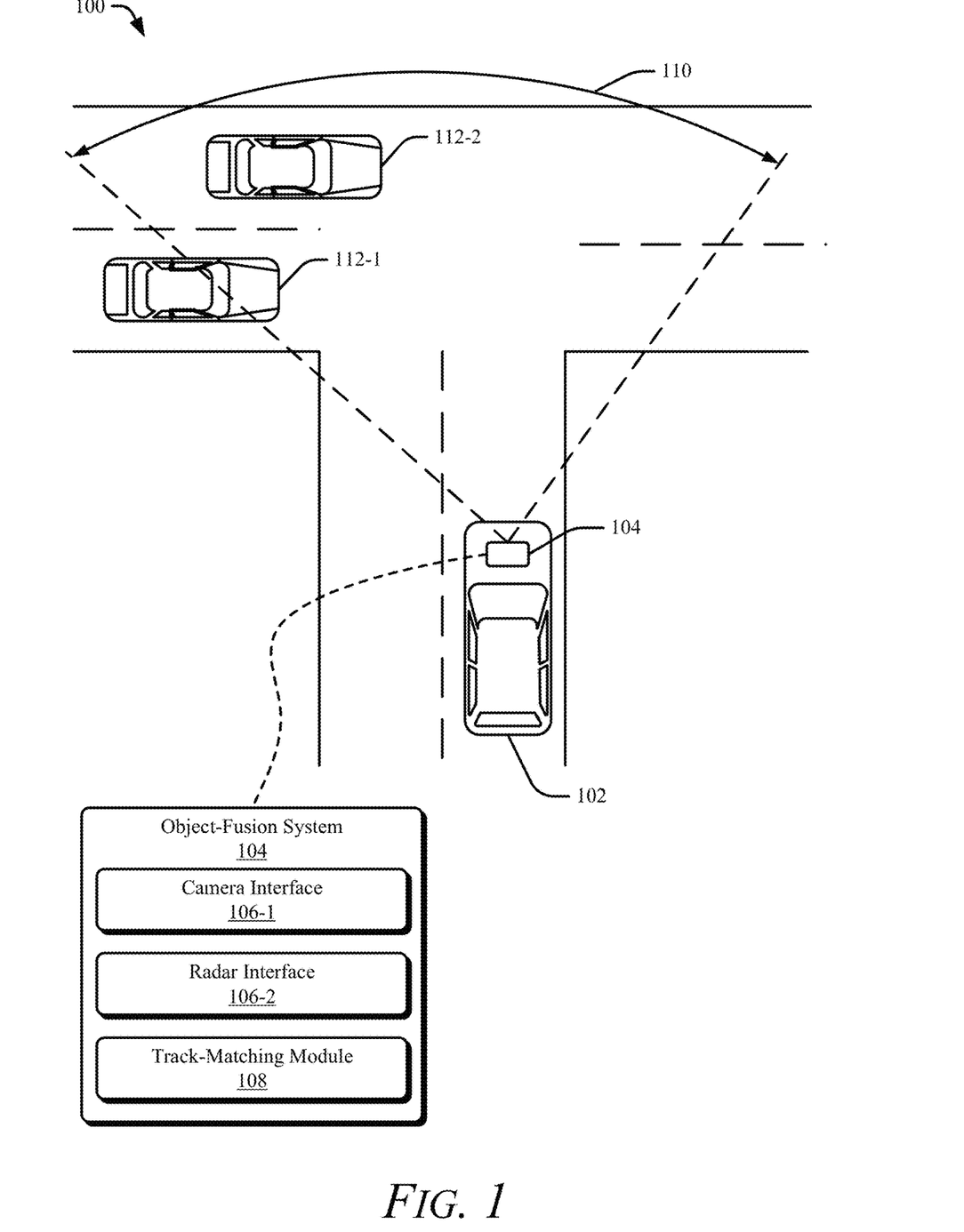
FIG. 1 illustrates an example environment in which a system is configured to perform history-based identification of incompatible tracks in accordance with techniques of this disclosure.

FIG. 1 illustrates an example environment 100 in which a system 102 is configured to perform history-based identification of incompatible tracks in accordance with techniques of this disclosure. In the depicted environment 100, the system 102 is an automobile. Sometimes also referred to as a vehicle 102, the system 102 can represent any type of apparatus or machinery, including manned and unmanned systems that may be used for a variety of purposes. Some non-exhaustive and non-limiting examples of the vehicle 102 include a motorcycle, a bus, a tractor, a semi-trailer truck, watercraft, aircraft, or other equipment or machine.

The vehicle 102 may be equipped with an object-fusion system 104 that may include one or more sensor interfaces 106, including a camera interface 106-1, a radar interface 106-2, and a track-matching module 108. With the object-fusion system 104, the vehicle 102 has an instrument field-of-view (FOV) 110 that may encompass one or more vehicles 112, which includes vehicle 112-1 and vehicle 112-2. The object-fusion system 104 can capture the FOV 110 from any exterior surface of the vehicle 102. Positioning the camera and radar components that interface to the object-fusion system 104 in a certain way can cause the object-fusion system 104 to have a particular FOV. For example, positioning one or more of the cameras and radar together can ensure the FOV of the object-fusion system 104 includes areas above, adjacent to, or on a road on which the vehicle 102 may be traveling. At least a part of the object-fusion system 104 can be integrated into a side mirror, bumper, roof, or any other part of the vehicle 102.

Although not precisely shown in FIG. 1, the track-matching module 108 executes on a processor or other hardware. During execution, the track-matching module 108 can track objects based on sensor data obtained at the camera interface 106-1 and the radar interface 106-2. The camera interface 106-1 receives camera data from one or more cameras of the vehicle 102, and the radar interface 106-2 receives radar data from at least one radar of the vehicle 102. The track-matching module 108 of the object-fusion system 104 accesses the camera interface 106-1 and the radar interface 106-2 to obtain camera data and radar data, respectively. As will be appreciated from other parts of this description, the object-fusion system 104 may include additional sensor interfaces 106 (e.g., LiDAR) than those shown in FIG. 1.

The track-matching module 108 configures the object-fusion system 104 to associate or disassociate different types of tracks obtained from the sensor interfaces 106. The track-matching module 108 identifies a plurality of tracks according to first sensor data (e.g., obtained from the camera interface 106-1) and determines a plurality of tracks according to second sensor data (e.g., obtained from radar interface 106-2). In pairing or associating two tracks, the track-matching module evaluates tracks according to first sensor data against tracks according to second sensor data to determine whether a pair of tracks (e.g., an object-pair) represents a good candidate for association. For example, if the camera interface 106-1 receives a first track related to vehicle 112-1 and the radar interface 106-2 receives a second track related to vehicle 112-2, the track-matching module pairs the first track and the second track and, using the techniques described herein, in addition to other techniques that may or may not be used, determines whether the first track and the second track match to represent a common vehicle 112.

To associate or disassociate different types of tracks collected by the sensor interfaces 106, the track-matching module 108 executes a track-matching process that pairs tracks that appear in the camera data with tracks that appear in the radar data. When pairing multiple large sets of tracks, the track-matching module 108 may generate a feasibility matrix and an incompatibility matrix. The object-fusion system 104 assigns an identifier to each track with an object candidate detected using a camera, and the object-fusion system 104 assigns an identifier to each track (e.g., detection) obtained using radar.

One example of a feasibility matrix is a matrix of object track pairs. Each element value in the feasibility matrix indicates a probability that the different object-tracks of the object-track pair are associated with a same object. The feasibility matrix may be created by one or more of several different methods and is the primary means for tracking object-fusion.

In this example, the incompatibility matrix complements the feasibility matrix by tracking historical data. The object-fusion system may adjust the probabilities indicated in the feasibility matrix based on the historical data.

The incompatibility matrix is created with two dimensions, although with additional sensors the incompatibility matrix can conceivably include more than two dimensions. The first dimension represents a total number of columns, with one column per each assigned camera identifier assigned to the camera data. The second dimension represents a total number of rows, with one row per radar identifier assigned to the radar data, and so forth for each dimension. For each combination of camera and radar pairs represented by the incompatibility matrix, a parameter (e.g., a binary value) is assigned based on state differences between the tracks originating from the camera data and the tracks originating from the radar data, which is compared to a threshold parameter (e.g., a state threshold value) for that state, and evaluated over a threshold quantity of consecutive frames. The parameter or binary value indicates whether the track from the camera data and the track from the radar data represent different objects.

Example Architecture

Figure 2:
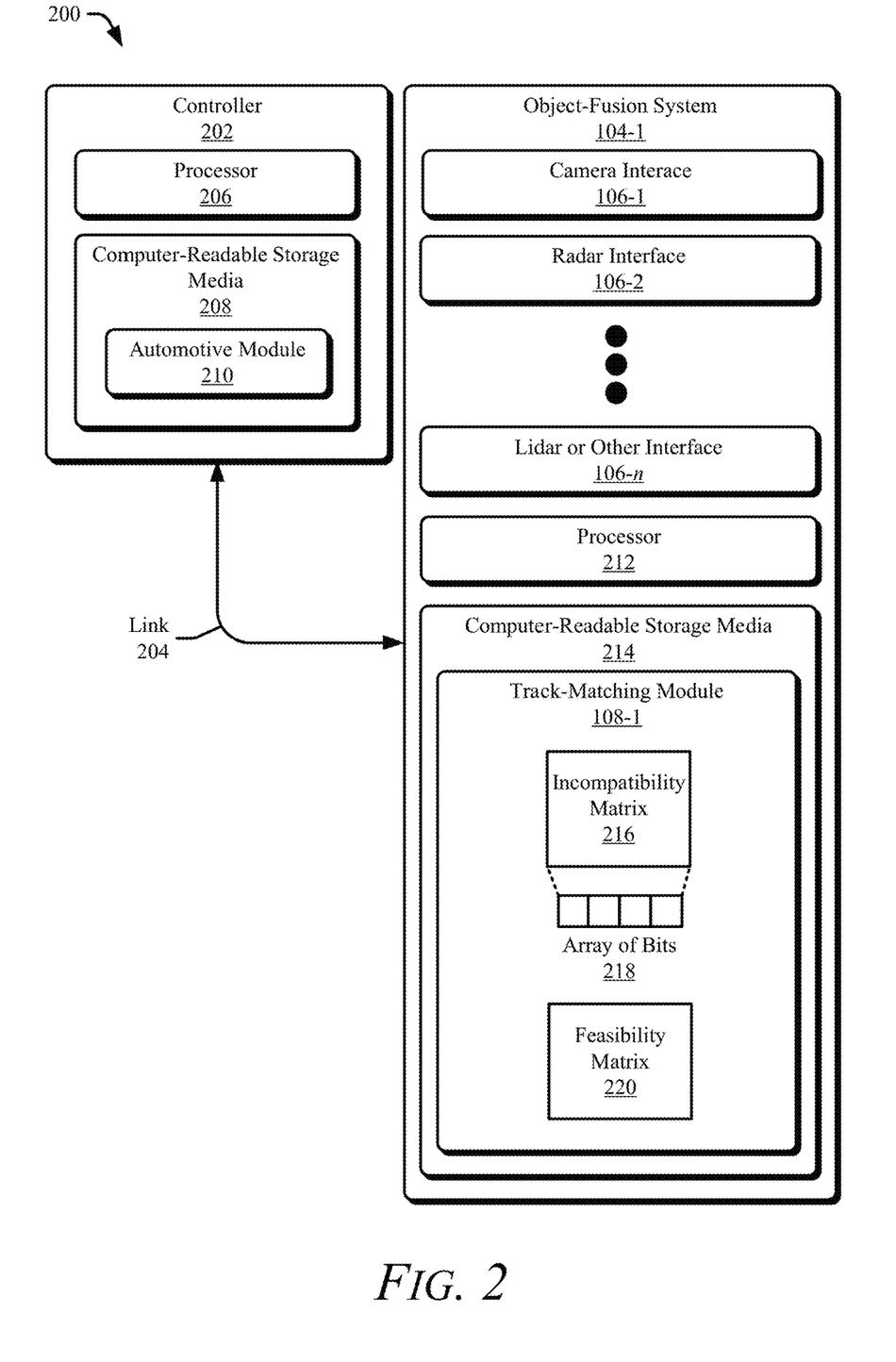
FIG. 2 illustrates an example of an automotive system configured to perform history-based identification of incompatible tracks in accordance with techniques of this disclosure.

FIG. 2 illustrates an example of an automotive system 200 configured to perform history-based identification of incompatible tracks in accordance with techniques of this disclosure. The automotive system 200 can be integrated within the vehicle 102 shown in FIG. 1 and is described in that context. For example, the automotive system 200 includes a controller 202 and an object-fusion system 104-1, which is an example of the object-fusion system 104. The object-fusion system 104-1 and the controller 202 communicate over a link 204. The link 204 may be a wired or wireless link and, in some cases, includes a communication bus. The controller 202 performs operations based on information received over the link 204, such as an indication of a compatibility output from the object-fusion system 104-1 as objects in the FOV are identified from processing and merging tracks based at least partially on the incompatibility matrix.

The controller 202 includes a processor 206 and a computer-readable storage medium (CRM) 208 (e.g., a memory, long-term storage, short-term storage), which stores instructions for an automotive module 210. The object-fusion system 104-1 includes the camera interface 106-1 in addition to the radar interface 106-2. Any number of other sensor interfaces 106 may be used, including a LiDAR interface or other sensor interface 106-n. The object-fusion system 104-1 may include processing hardware that includes a processor 212 (e.g., a hardware processor, a processing unit) and a computer-readable storage medium (CRM) 214, which stores instructions associated with a track-matching module 108-1. The track-matching module 108-1, which is an example of the track-matching module 108, includes an incompatibility matrix 216 stored as an array of bits 218 and a feasibility matrix 220.

The processors 206 and 212 can be two separate or a single processing unit (e.g., microprocessor) or a pair of or a single system-on-chip of a computing device, a controller, or a control unit. The processors 206 and 212 execute computer-executable instructions stored within the CRMs 208 and 214. As an example, the processor 206 can execute the automotive module 210 to perform a driving function (e.g., an autonomous lane change maneuver, a semi-autonomous lane-keep feature) or other operation of the automotive system 200. Similarly, the processor 212 can execute the track-matching module 108-1 to infer objects in the FOV based on sensor data obtained from multiple sensor interfaces 106 of the system 102. The automotive module 210, when executing at the processor 206, can receive an indication of one or more objects detected by the track-matching module 108-1 in response to the track-matching module 108-1 combining and analyzing sensor data generated at each of the sensor interfaces 106.

Generally, the automotive system 200 executes the automotive module 210 to perform an automotive function, which may include using output from the object-fusion system 104-1. For example, the automotive module 210 can provide automatic cruise control and monitor the object-fusion system 104-1 for output that indicates the presence of objects in or near the FOV 110, for instance, to slow the speed and prevent a rear-end collision with the vehicle 112. In such an example, the track-matching module 108-1 provides sensor data or a derivative thereof (e.g., an incompatibility matrix) as output to the automotive module 210. The automotive module 210 may provide alerts or perform a specific maneuver when the data obtained from the track-matching module 108-1 indicates that one or more objects are crossing in front of the vehicle 102.

Figure 3:
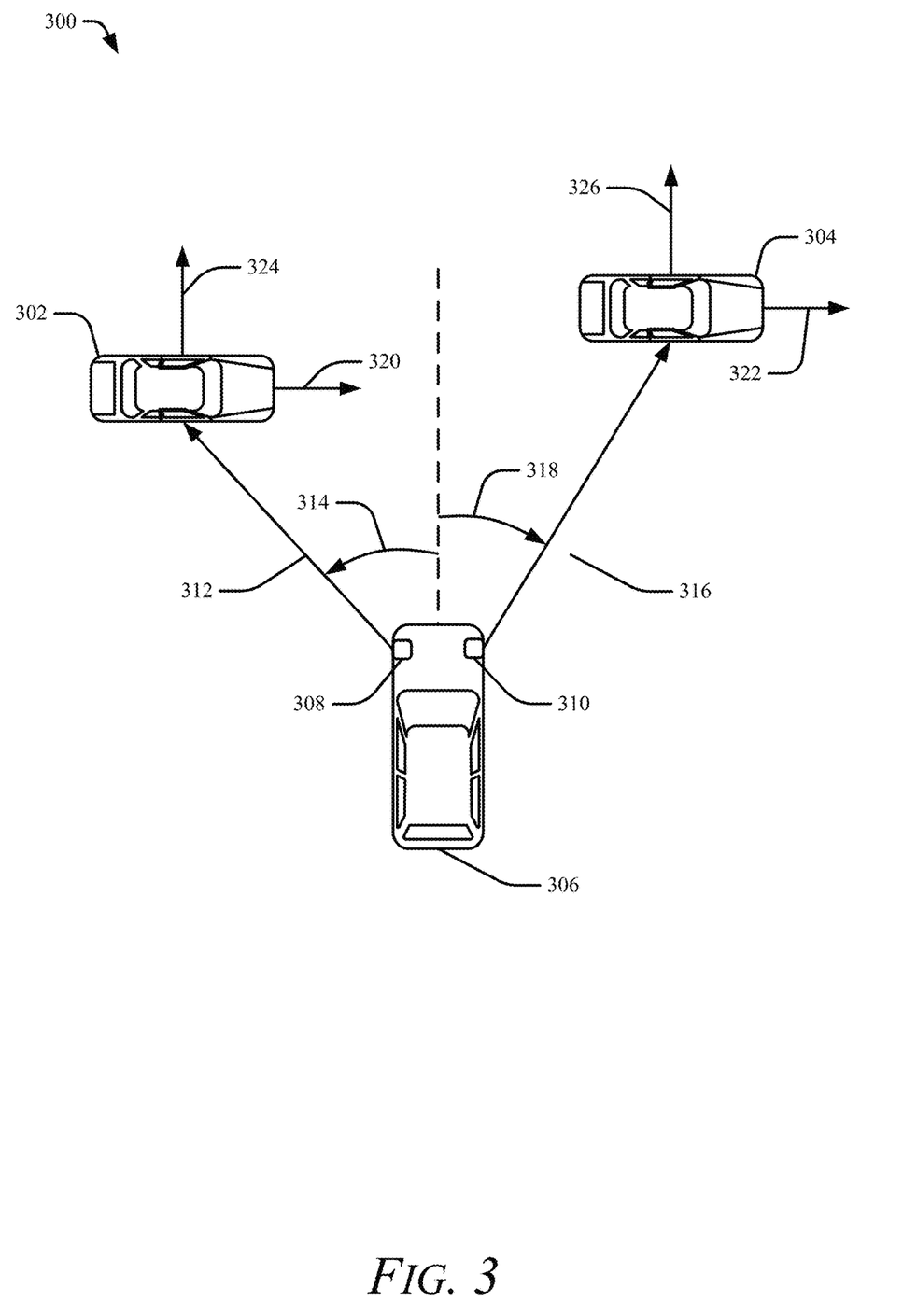
FIG. 3 illustrates an example scenario where tracks are received by a vehicle that is configured to perform history-based identification of incompatible tracks in accordance with techniques of this disclosure.

FIG. 3 illustrates an example scenario 300 where tracks 302 and 304 are received by a vehicle 306 that is configured to perform history-based identification of incompatible tracks in accordance with techniques of this disclosure. In FIG. 3, the track 302 may be a first track identified by one sensor interface 308 (e.g., the camera interface 106-1 from FIG. 1) on the vehicle 306, and the track 304 may be a second track identified by a different sensor interface 310 (e.g., the radar interface 106-2 from FIG. 1) on the vehicle 306. Different states of the vehicle 306 can be extracted from the track data, including a range 312 (r-312), an azimuth angle 314 ($\theta$-314), a longitudinal velocity 320 (vlong-320), and a lateral velocity 324 (vlat-324) of track 302, in addition to other conceivable states. For the track 304, a range 316 (r-316), an azimuth angle 318 ($\theta$-318), a longitudinal velocity 322 (vlong-322), and a lateral velocity 326 (vlat-326) can be extracted. Other track states, not illustrated in FIG. 3, may also be used in the history-based identification of incompatible tracks. In order to identify if the tracks 302 and 304 are compatible or incompatible, a difference is calculated between the corresponding states of the two different tracks 302 and 304 in a common frame of time. For example, a difference between r-312 and r-316 is calculated, and a difference between $\theta$-314 and $\theta$-318 is calculated. Likewise, a difference between vlong-320 and vlong-322 is calculated, and a difference between vlat-324 and vlat-326 is calculated. Each difference is compared to a threshold value for that particular state. If the difference is greater than the threshold value for that state difference, then the track pair is likely not compatible.

This incompatibility may be true if only one of the state differences is greater than the corresponding state threshold value and the other differences are less than the corresponding state threshold value. For example, the incompatibility of the track pair (302, 304) may be calculated as:

Incompatibility=|r-312−r-316|>Range_Threshold, or

|θ-314−θ-318|>Azimuth_Threshold, or

|vlong-320−vlong-322|>Long_Velocity_Threshold, or

|vlat-324−vlat-326|>Lat-Velocity_Threshold.

If an incompatibility between the track pair is calculated in a frame, then a frame counter is activated such that the incompatibility is calculated for a threshold quantity of frames prior to an incompatibility decision being made. If the threshold quantity of frames is reached and the incompatibility of the track pair still remains (e.g., all of the state differences being analyzed remain beyond the state threshold value for the duration of the threshold quantity of frames), then historically (e.g., per the threshold quantity of frames), the track pair may be considered as tracking different objects. In this example, the incompatibility of a track pair may be assigned a binary value of 1, and the compatibility of a track pair may be assigned a binary value of 0. In other aspects, the binary value assignments may be reversed, with 1 corresponding to compatibility and 0 corresponding to incompatibility. If multiple track pairs are being historically tracked in this manner, the incompatibility data may be arranged as an incompatibility matrix.

Figure 4:
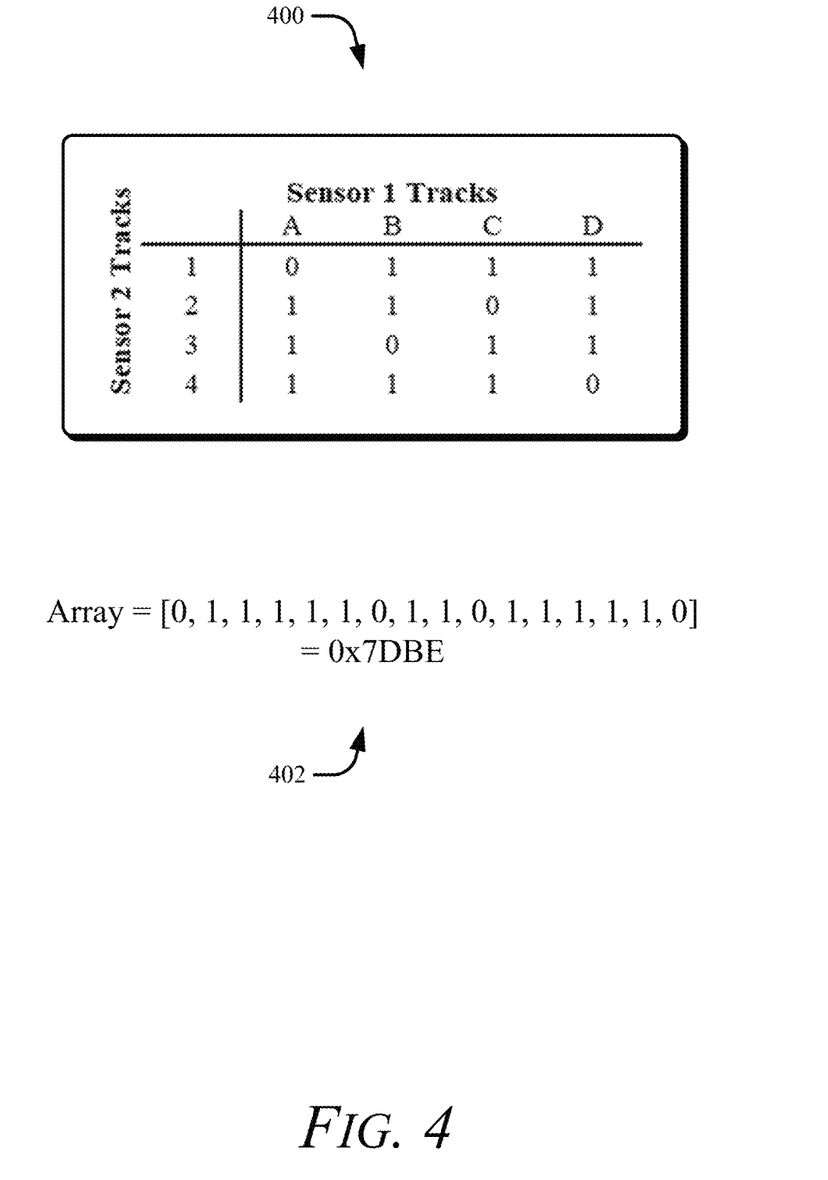
FIG. 4 illustrates an example incompatibility matrix used to perform history-based identification of incompatible tracks in accordance with techniques of this disclosure.

FIG. 4 illustrates an example incompatibility matrix 400 used to perform history-based identification of incompatible tracks in accordance with techniques of this disclosure. The columns in the incompatibility matrix 400 represent tracks originating from a first sensor interface (e.g., track 302), and the rows in the incompatibility matrix 400 represent tracks originating from a different sensor interface (e.g., track 304). In this example, if the track 302 was equivalent to column A in the incompatibility matrix 400, and if the track 304 was equivalent to row 3 in the incompatibility matrix 400, the track pair (302, 304) has an incompatibility assignment of 1 (e.g., element A-3 in the incompatibility matrix 400). If compatibility became likely over the threshold quantity of frames, the incompatibility assignment would become 0. FIG. 4 further illustrates that the incompatibility matrix may be arranged and stored as an array of bits 402. In this example, sixteen track pairs are identified and stored as a sixteen-element (e.g., sixteen bit) array. In other examples, a more complex encoding scheme may be used (e.g., representing each of the track pairs in an array with fewer than a total quantity of pairs of bits). The array is illustrated such that a first bit in the array corresponds to track pair A-1, the second bit corresponds to A-2 and so forth. However, the array may be arranged differently, such as having the rows listed first (e.g., A-1, B-1, . . . , C-4, D-4), moving in reverse (e.g., D-4, D-3, . . . , A-2, A-1), or any other arrangement of the bits representing the elements of the incompatibility matrix 400.

By storing the incompatibility matrix 400 as an array of bits with each bit representing the incompatibility of a different track pair, a large amount of information about the historical relationship of different tracks may be stored in an efficient and inexpensive manner utilizing little computing resources.

Example Scenarios

Figure 51:
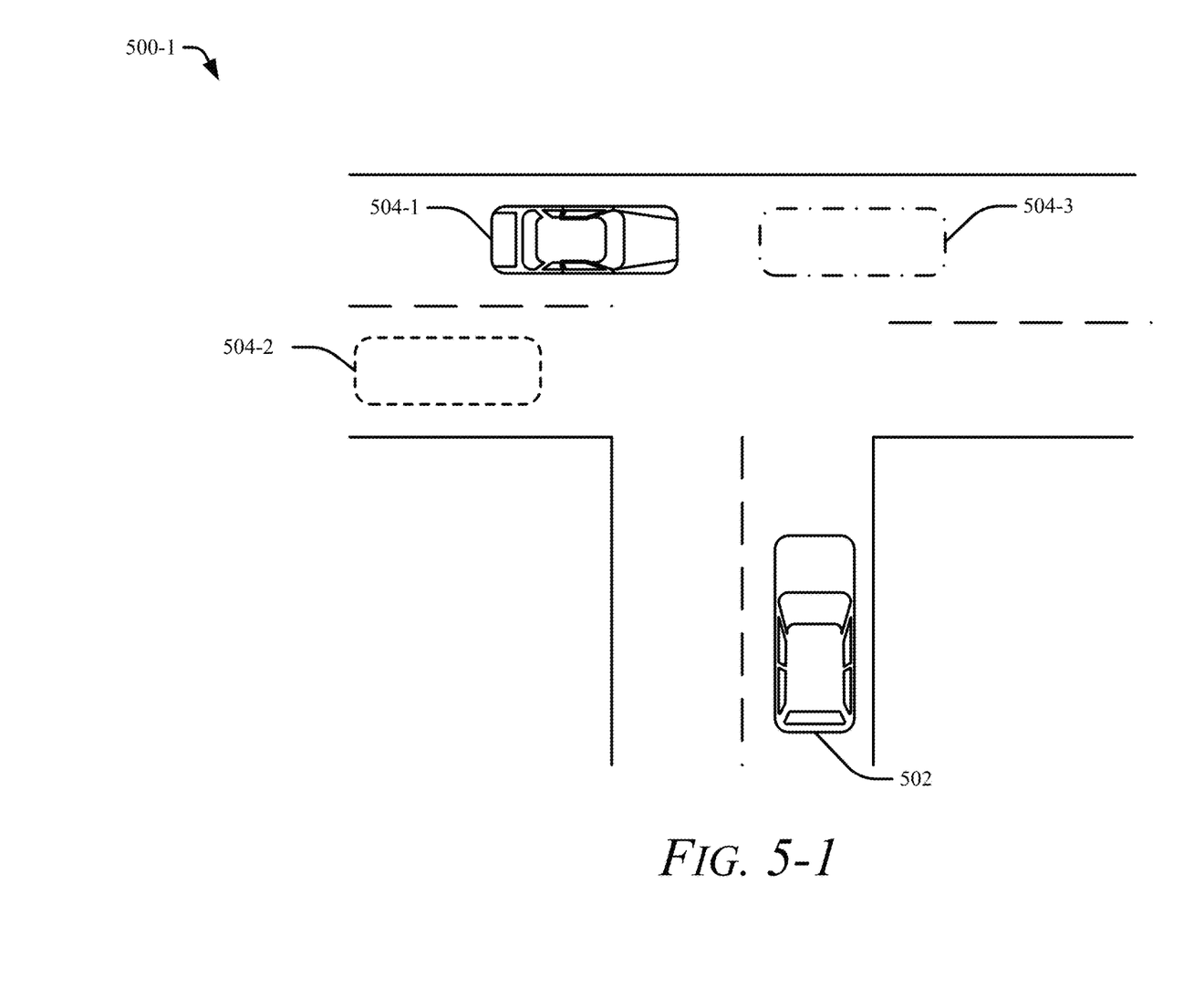

FIG. 5-1 illustrates an example implementation 500-1 of history-based identification of incompatible tracks in accordance with techniques of this disclosure. In implementation 500-1, a vehicle 502 is equipped to perform history-based identification of incompatible tracks. At least one object 504-1 is in the FOV of at least two sensors installed on vehicle 502. A track 504-2 is received by one sensor interface of vehicle 502 in a same frame as a track 504-3 is received by a second sensor interface of vehicle 502. The difference between at least one track-state from tracks 504-2 and 504-3, for example, an azimuth angle, is greater than the state threshold error for compatible tracks set for that track-state. In this case, the difference in track states suggests an incompatibility of the two tracks 504-2 and 504-3, even if the other track states suggest a compatibility. If this difference persists in consecutive number of frames set by the frame counter, the two tracks 504-2 and 504-3 may be considered historically incompatible. However, if at some frame, the difference in the track states of the two tracks 504-2 and 504-3 falls within feasibility gating, that is, the state error is below the feasibility gating threshold value set for determining the feasibility of two tracks referring to the same object at any given frame index, another frame counter begins to count frames in which the two tracks remain feasible. Once the threshold quantity of frames is reached where the feasibility is maintained, then the tracks become compatible to each other, and the tracks 504-2 and 504-3 may be considered to possibly track a same object 504-1. This feasible track pair may then be further considered with other data, object class being one such data, to further determine whether the track pair (504-2, 504-3) represents object 504-1. In the implementation 500-1, the azimuth angle is the state difference that exceeds its state threshold value for compatibility; however, any one or multiple of the track state differences between tracks 504-2 and 504-3 may be greater than the state threshold value of compatibility for that particular state and suggest incompatibility. Once all the state differences remain below the feasibility gating threshold (not the compatibility state threshold mentioned in [0026].) for the threshold quantity of frames, then the tracks 504-2 and 504-3 may represent a common object 504-1 based on a historical relationship of the tracks 504-2 and 504-3.

Figure 52:
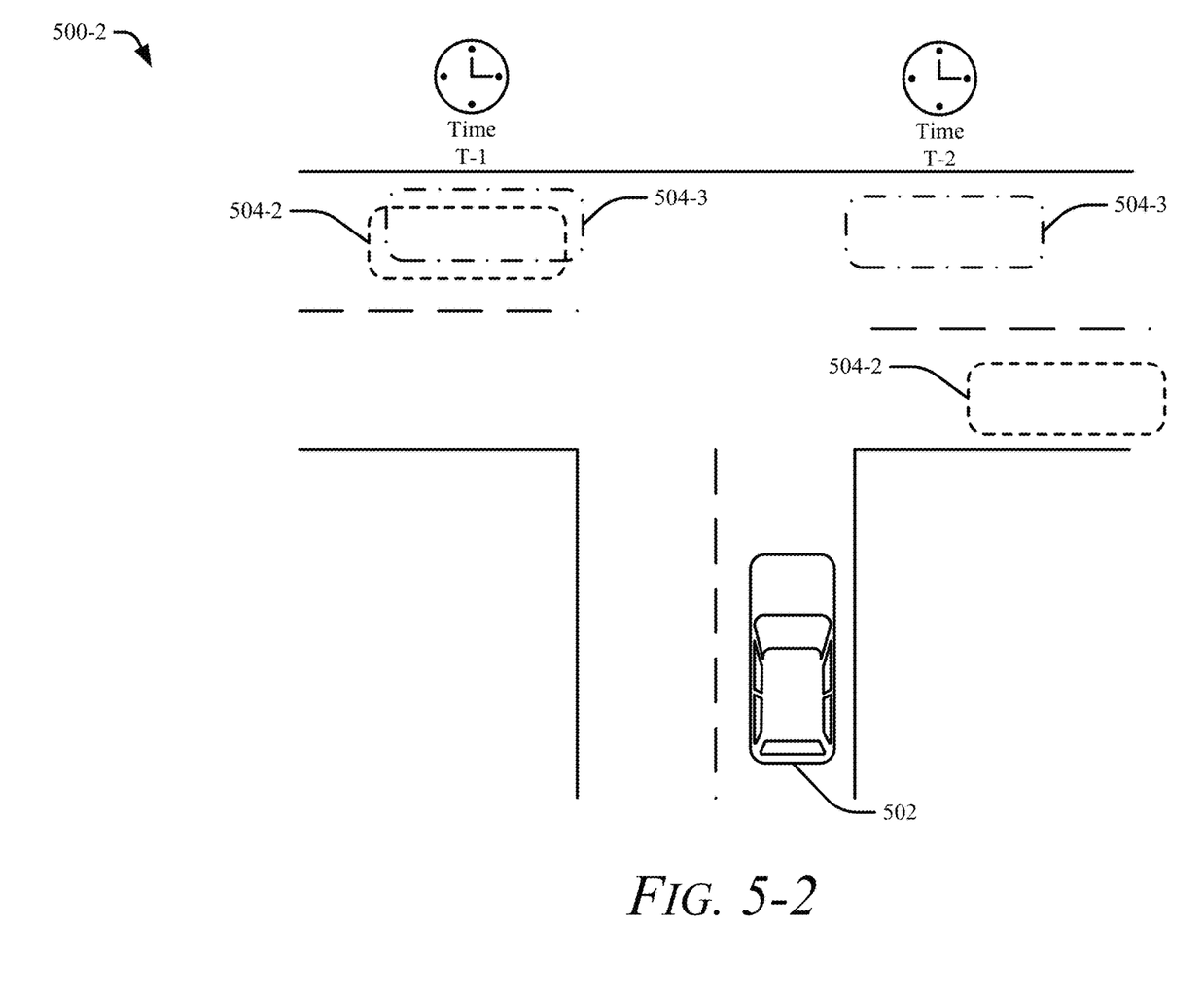

FIG. 5-2 illustrates another example implementation 500-2 of history-based identification of incompatible tracks in accordance with techniques of this disclosure. In the implementation 500-2, the state differences of tracks 504-2 and 504-3 are all less than the relative state threshold values for compatible tracks at frame T-1. However, at frame T-2, which may or may not occur consecutively after frame T-1, one or more of the state differences of the tracks 504-2 and 504-3 are determined to be greater than the relative state differences. In some aspects, a counter may begin in this instance to determine whether the track pair (504-2, 504-3) remains incompatible for some threshold quantity of frames before making a decision that tracks 504-2 may be tracking a different object than track 504-3. In other aspects, at frame T-2, the track pair (504-2, 504-3) may immediately be determined incompatible and may not be decided to be a compatible pair again until the states' differences remain less than the feasibility gating threshold values for the threshold quantity of frames.

Example Methods

Figure 6:
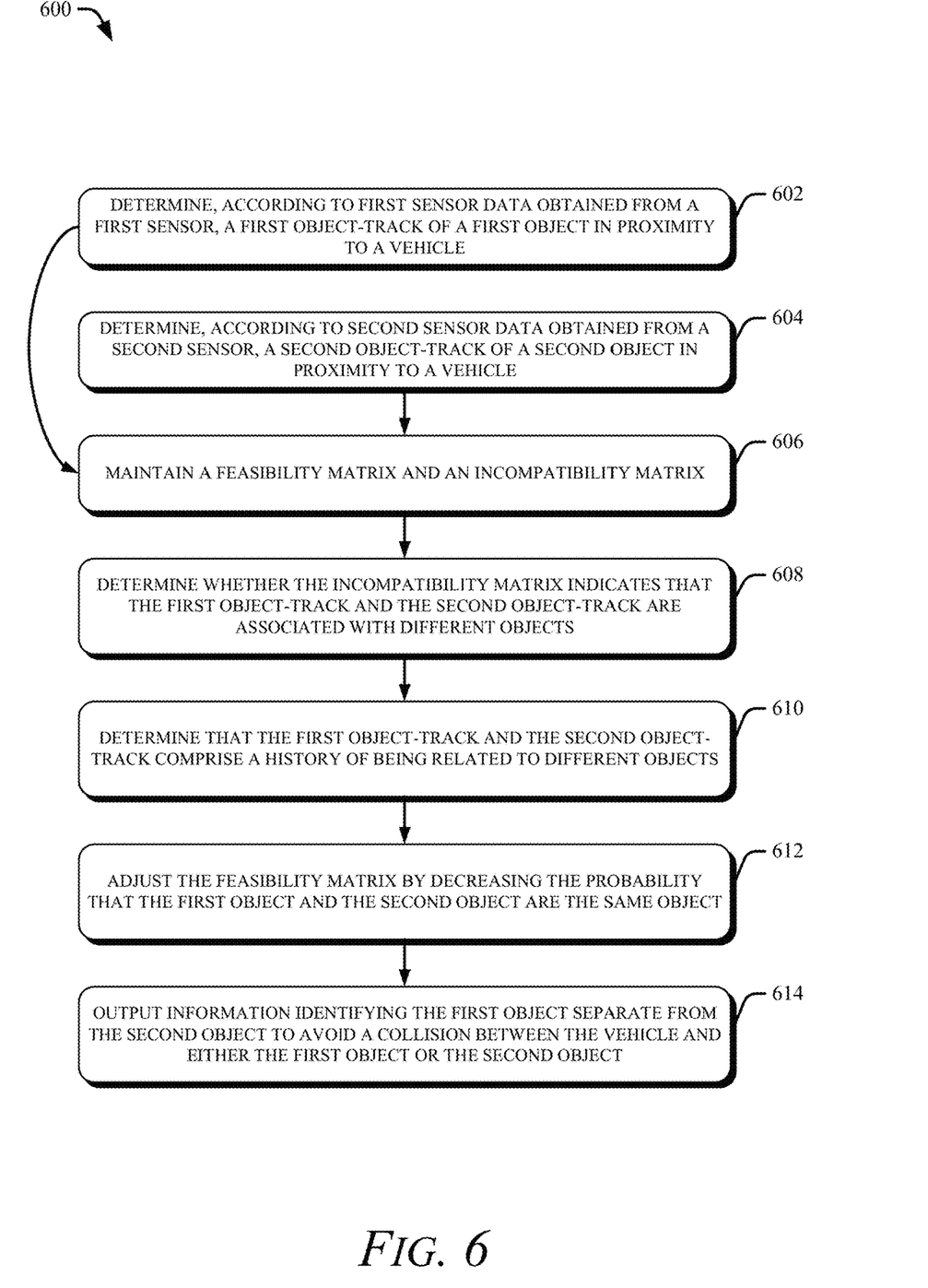
FIG. 6 illustrates an example method for history-based identification of incompatible tracks in accordance with techniques of this disclosure.

FIG. 6 illustrates an example method for history-based identification of incompatible tracks in accordance with techniques of this disclosure. The method 600 is shown as a set of operations (or acts) performed in, but not limited to, the order or combinations in which the operations are shown or described. Further, any of the operations may be repeated, combined, or reorganized to provide other methods. In portions of the following discussion, reference may be made to the previously introduced figures in describing some non-limiting examples of the method 600.

At 602, a first track of a first object in proximity to a vehicle, such as the vehicle 102, is determined by an object fusion system of the vehicle and according to first sensor data obtained by a first sensor. The first track may be associated with at least a portion of a stationary object or a portion of a moving object, such as the vehicle 112.

At 604, a second track of a second object in proximity to the vehicle is determined by the object fusion system of the vehicle and according to second sensor data obtained by a second sensor. In some examples, the first sensor may include one or more optical cameras or infrared cameras, and the second sensor may include one or more radar sensors, LiDAR sensors, or ultrasound sensors.

At 606, a feasibility matrix and an incompatibility matrix are maintained by the object fusion system. Each element value in the feasibility matrix indicates a probability that the different object-tracks of the object-track pair are associated with a same object at a given time/frame index. The incompatibility matrix is indicative of whether the first track and the second track are historically associated with different objects. The track-matching module 108-1 pairs the first track and the second track, and the track pair is represented as an element of the incompatibility matrix. The data from the first track is compared to the data from the second track, and based on the outcome of the comparison, a value of the element is set. The value of the element, representing the track pair, indicates whether the track pair is historically incompatible or compatible based on data derived from the first and second tracks. In some aspects, this value may be a binary value, and the value suggests whether the track pair may or may not be incompatible. The element value of the track pair is updated regularly. An object-fusion system may adjust the probabilities indicated in the feasibility matrix based on the element value of the corresponding object-track pair in the incompatibility matrix.

At 608, whether the incompatibility matrix indicates that the first track and the second track are historically associated with the different objects is determined. The track-matching module 108-1 makes the comparison of the first track and the second track on consecutive frames continuing for the existence of the track pair. That is, as long as the first track and the second track exist, the track pair may be updated, based on the comparison of the track data to one another, at each frame that the data arrive. If the first track and the second track are associated with the same object for a threshold quantity of consecutive frames, the binary value of the element representing the object-pair is changed.

At 610, responsive to determining that the incompatibility matrix indicates that the first track and the second track are associated with the different objects for at least the threshold quantity of consecutive frames, that the first track and the second track comprise a history of being related to different objects is determined. The binary value of the element representing the track pair may express the historical relationship between the first track and the second track. For example, if the first track and the second track appear to be incompatible (e.g., the two tracks have a difference in position greater than the state threshold value for compatible tracks), the binary value of the element representing the track pair may be set to '1'. If at some point the track pair becomes a feasible pair, a counter will count the number of frames the track pair remains feasible. If the counter reaches the threshold quantity of consecutive frames, the comparison suggests the likelihood of the tracks associating with the same object, a historical relationship between the two tracks is established, the binary value of the element can change to '0' to indicate the nature of the relationship.

At 612, responsive to determining that the first track and the second track comprise a history of being related to different objects, the feasibility matrix is adjusted by decreasing the probability that the first object and the second object are the same object at a current time index. Knowing the history of the relationship between the first track and the second track may assist the feasibility process to accurately make decisions about the feasibility of track pairs associating with a common object.

At 614, information identifying the first object separate from the second object to avoid a collision between the vehicle and either the first object or the second is output to an automotive system of the vehicle, responsive to adjusting the feasibility matrix by decreasing the probability that the first object and the second object are the same object. The binary value of the element representing the object-pair may be easily sent, transferred, read, or otherwise transmitted to the automotive system. Alternatively, the information contained in the incompatibility matrix may be further used by the object-fusion system, in addition to other data collected and derived by the one or more first sensor and the second sensor, to determine object-pair association. The object-fusion system may output this information about the object-pair to the automotive system.

ADDITIONAL EXAMPLES

In the following section, additional examples of history-based identification of incompatible tracks are provided.

Example 1. A method, the method comprising: determining, by an object fusion system of a vehicle and according to first sensor data obtained by a first sensor, a first track of a first object in proximity to the vehicle; determining, by the object fusion system and according to second sensor data obtained by a second sensor, a second track of a second object in proximity to the vehicle; maintaining, by the object fusion system, a feasibility matrix indicative of a probability that the first object and the second object are a same object at a given time index and an incompatibility matrix indicative of whether the first track and the second track are historically associated with different objects; determining whether the incompatibility matrix indicates that the first track and the second track are associated with different objects; responsive to determining that the incompatibility matrix indicates that the first track and the second track are associated with different objects, determining that the first track and the second track comprise a history of being related to different objects; responsive to determining that the first track and the second track comprise a history of being related to different objects, adjusting the feasibility matrix by decreasing the probability that the first object and the second object are the same object; and responsive to adjusting the feasibility matrix by decreasing the probability that the first object and the second object are the same object, outputting, to an automotive system of the vehicle, information identifying the first object separate from the second object to avoid a collision between the vehicle and either the first object or the second object.

Example 2. The method of the preceding example, further comprising: responsive to determining that the incompatibility matrix indicates that the first track and the second track are associated with the same object for at least the threshold quantity of consecutive frames, determining that the first track and the second track comprise a history of being related to the same object; responsive to determining that the first track and the second track comprise the history of being related to the same object, adjusting the feasibility matrix by increasing the probability that the first object and the second object are the same object; and responsive to adjusting the feasibility matrix by increasing the probability that the first object and the second object are the same object, outputting, to the automotive system, information identifying the same object to avoid a collision between the vehicle and the same object.

Example 3. The method of example 2, wherein determining whether the incompatibility matrix indicates, for at least a threshold quantity of consecutive frames, that the first track and the second track are associated with the same object further comprises: incrementing a count associated with the consecutive frames, the count being a temporal indicator of whether the tracks are the same object; and setting the threshold quantity of consecutive frames to a particular value that is based on a measurable-accuracy of the first sensor and a measurable accuracy of the second sensor.

Example 4. The method of example 3, further comprising: responsive to incrementing the count associated with the consecutive frames, resetting the count if the tracks are determined to comprise a history of being related to two different objects.

Example 5. The method of example 3, further comprising: setting the threshold quantity of consecutive frames to a particular value that is further based on an age of one or more of the first track and second track.

Example 6. The method of any preceding examples, wherein maintaining an incompatibility matrix comprises: determining a difference between a vehicle state derived from the first track and the same vehicle state derived from the second track; comparing the difference with a state threshold value; and responsive to comparing the difference with the state threshold value, assigning a binary value to an element in the incompatibility matrix, the element corresponding to the association of the first track and the second track.

Example 7. The method of example 6, further comprising: storing the binary value as an array of bits corresponding to the association of the first track and the second track.

Example 8. The method of example 6, wherein the vehicle state includes one or more of position, velocity, azimuth angle, or range.

Example 9. The method of any of the preceding examples, wherein the first sensor comprises a vision sensor, a radar sensor, or a Light Detection and Ranging sensor.

Example 10. The method of example 9, wherein the second sensor comprises a vision sensor, a radar sensor, or a Light Detection and Ranging sensor.

Example 11. A system, the system comprising: one or more processors configured to perform the method of any of the preceding examples.

Example 12. A system comprising means for performing the method of any of the preceding examples.

Example 13. A computer-readable storage medium comprising instructions that, when executed, configure one or more processors to perform the method of ant of the preceding examples.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims. Problems associated with incompatible tracks can occur in other systems that identify and process tracks from a variety of sensors. Therefore, although described as a way to improve vehicle-based matching techniques, the techniques of the foregoing description can be applied to other problems to efficiently and inexpensively match objects based on the historical relationship of multiple tracks.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a–b, a–c, b–c, and a–b–c, as well as any combination with multiples of the same element (e.g., a–a, a–a–a, a–a–b, a–a–c, a–b–b, a–c–c, b–b, b–b–b, b–b–c, c–c, and c–c–c or any other ordering of a, b, and c).

What is claimed is:

1. A method, the method comprising:
   determining, by an object fusion system of a vehicle and according to first sensor data obtained by a first sensor, a first track of a first object in proximity to the vehicle;
   determining, by the object fusion system and according to second sensor data obtained by a second sensor, a second track of a second object in proximity to the vehicle;
   maintaining, by the object fusion system, a feasibility matrix indicative of a probability that the first object and the second object are a same object at a given time index and an incompatibility matrix indicative of whether the first track and the second track are historically associated with different objects;
   determining whether the incompatibility matrix indicates that the first track and the second track are associated with different objects;
   responsive to determining that the incompatibility matrix indicates that the first track and the second track are associated with different objects, determining that the first track and the second track comprise a history of being related to different objects;
   responsive to determining that the first track and the second track comprise a history of being related to different objects, adjusting the feasibility matrix by decreasing the probability that the first object and the second object are the same object;
   responsive to adjusting the feasibility matrix by decreasing the probability that the first object and the second object are the same object, outputting, to an automotive system of the vehicle, information identifying the first object separate from the second object to avoid a collision between the vehicle and either the first object or the second object;

determining whether the incompatibility matrix indicates, for at least a threshold quantity of consecutive frames, that the first track and the second track are associated with the same object by: incrementing a count associated with the consecutive frames, the count being a temporal indicator of whether the tracks are the same object; and setting the threshold quantity of consecutive frames to a particular value that is based on a measurable accuracy of the first sensor and a measurable accuracy of the second sensor;

responsive to determining that the incompatibility matrix indicates that the first track and the second track are associated with the same object for at least the threshold quantity of consecutive frames, determining that the first track and the second track comprise a history of being related to the same object;

responsive to determining that the first track and the second track comprise the history of being related to the same object, adjusting the feasibility matrix by increasing the probability that the first object and the second object are the same object; and responsive to adjusting the feasibility matrix by increasing the probability that the first object and the second object are the same object, outputting, to the automotive system, information identifying the same object to avoid a collision between the vehicle and the same object.

2. The method of claim 1, further comprising:

responsive to incrementing the count associated with the consecutive frames, resetting the count if the tracks are determined to comprise a history of being related to two different objects.

3. The method of claim 1, further comprising:

setting the threshold quantity of consecutive frames to a particular value that is further based on an age of one or more of the first track and second track.

4. The method of claim 1, wherein maintaining an incompatibility matrix comprises:

determining a difference between a vehicle state derived from the first track and the same vehicle state derived from the second track;

comparing the difference with a state threshold value; and responsive to comparing the difference with the state threshold value, assigning a binary value to an element in the incompatibility matrix, the element corresponding to the association of the first track and the second track.

5. The method of claim 4, further comprising:

storing the binary value as an array of bits corresponding to the association of the first track and the second track.

6. The method of claim 4, wherein the vehicle state includes one or more of position, velocity, azimuth angle, or range.

7. The method of claim 1, wherein the first sensor comprises:

a vision sensor;

a radar sensor; or a Light Detection and Ranging sensor.

8. The method of claim 7, wherein the second sensor comprises:

a vision sensor;

a radar sensor; or a Light Detection and Ranging sensor.

9. A system, the system comprising:

one or more processors configured to:

determine, according to first sensor data obtained by a first sensor of a vehicle, a first track of a first object in proximity to the vehicle;

determine, according to second sensor data obtained by a second sensor of the vehicle, a second track of a second object in proximity to the vehicle;

maintain a feasibility matrix indicative of a probability that the first object and the second object are a same object at a given time index and an incompatibility matrix indicative of whether the first track and the second track are historically associated with a same object;

determine whether the incompatibility matrix indicates that the first track and the second track are associated with different objects;

responsive to determining that the incompatibility matrix indicates that the first track and the second track are associated with different objects, determine that the first track and the second track comprise a history of being related to different objects;

responsive to determining that the first track and the second track comprise a history of being related to different objects, adjust the feasibility matrix by decreasing the probability that the first object and the second object are the same object;

responsive to adjusting the feasibility matrix by decreasing the probability that the first object and the second object are the same object, output, to an automotive system of the vehicle, information identifying the first object separate from the second object to avoid a collision between the vehicle and either the first object or the second object;

determine whether the incompatibility matrix indicates that the first track and the second track are associated with the same object for at least a threshold quantity of consecutive frames by: incrementing a count associated with the consecutive frames, the count being a temporal indicator of whether the tracks are the same object; and setting the threshold quantity of consecutive frames to a particular value that is based on a measurable accuracy of the first sensor and a measurable accuracy of the second sensor;

responsive to determining that the incompatibility matrix indicates that the first track and the second track are associated with the same object for at least a threshold quantity of consecutive frames, determine that the first track and the second track comprise a history of being related to the same object;

responsive to determining that the first track and the second track comprise the history of being related to the same object, adjust the feasibility matrix by increasing the probability that the first object and the second object are the same object; and responsive to adjusting the feasibility matrix by increasing the probability that the first object and the second object are the same object, output, to the automotive system, information identifying the same object to avoid a collision between the vehicle and the same object.

10. The system of claim 9, wherein the one or more processors are further configured to:

responsive to incrementing the count associated with the consecutive frames, reset the count if the tracks are determined to comprise a history of being related to two different objects.

11. The system of claim 9, wherein the one or more processors are further configured to:
   set the threshold quantity of consecutive frames to a particular value that is based on an age of one or more of the first track and second track.

12. The system of claim 9, wherein the one or more processors are further configured to maintain an incompatibility matrix by:
   determining a difference between a vehicle state derived from the first track and the same vehicle state derived from the second track;
   comparing the difference with a state threshold value; and
   responsive to comparing the difference with the state threshold value, assigning a binary value to an element in the incompatibility matrix, the element corresponding to the association of the first track and the second track.

13. The system of claim 12, wherein the one or more processors are further configured to:
   store the binary value as an array of bits corresponding to the association of the first track and the second track.

14. The system of claim 12, wherein the vehicle state includes one or more of position, velocity, azimuth angle, or range.

15. The system of claim 9, wherein the first sensor and the second sensor comprise one or more of:
   a vision sensor;
   a radar sensor; or
   a Light Detection and Ranging sensor.

16. A non-transitory computer-readable storage medium comprising instructions that, when executed, configure at least one processor to:
   determine, by an object fusion system of a vehicle and according to first sensor data obtained by a first sensor, a first track of a first object in proximity to the vehicle;
   determine, by the object fusion system and according to second sensor data obtained by a second sensor, a second track of a second object in proximity to the vehicle;
   maintain, by the object fusion system, a feasibility matrix indicative of a probability that the first object and the second object are a same object at a given time index and an incompatibility matrix indicative of whether the first track and the second track are historically associated with a same object;
   determine whether the incompatibility matrix indicates that the first track and the second track are associated with different objects;
   responsive to determining that the incompatibility matrix indicates that the first track and the second track are associated with different objects, determine that the first track and the second track comprise a history of being related to different objects;
   responsive to determining that the first track and the second track comprise a history of being related to different objects, adjust the feasibility matrix by decreasing the probability that the first object and the second object are the same object; and
   responsive to adjusting the feasibility matrix by decreasing the probability that the first object and the second object are the same object, output, to an automotive system of the vehicle, information identifying the first object separate from the second object to avoid a collision between the vehicle and either the first object or the second object;
   determine whether the incompatibility matrix indicates that the first track and the second track are associated with the same object for at least a threshold quantity of consecutive frames, the threshold quantity of consecutive frames being set to a particular value that is based on an age of one or more of the first track and second track;
   responsive to determining whether the incompatibility matrix indicates that the first track and the second track are associated with the same object for at least the threshold quantity of consecutive frames, determine that the first track and the second track comprise a history of being related to the same object;
   responsive to determining that the first track and the second track comprise the history of being related to the same object, adjust the feasibility matrix by increasing the probability that the first object and the second object are the same object; and
   responsive to adjusting the feasibility matrix by increasing the probability that the first object and the second object are the same object, output, to the automotive system, information identifying the same object to avoid a collision between the vehicle and the same object.

\* \* \* \* \*